United States Patent
Binzer

(10) Patent No.: US 9,046,603 B2
(45) Date of Patent: Jun. 2, 2015

(54) RADAR SENSOR FOR MOTOR VEHICLES, IN PARTICULAR RCA SENSOR

(75) Inventor: Thomas Binzer, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 118 days.

(21) Appl. No.: 13/822,676

(22) PCT Filed: Jul. 18, 2011

(86) PCT No.: PCT/EP2011/062192
§ 371 (c)(1),
(2), (4) Date: Sep. 9, 2013

(87) PCT Pub. No.: WO2012/034735
PCT Pub. Date: Mar. 22, 2012

(65) Prior Publication Data
US 2013/0338912 A1 Dec. 19, 2013

(30) Foreign Application Priority Data
Sep. 14, 2010 (DE) .......................... 10 2010 040 696

(51) Int. Cl.
*G01S 13/88* (2006.01)
*G01S 13/93* (2006.01)
*H01Q 3/30* (2006.01)
*H01Q 21/06* (2006.01)
*H01Q 1/32* (2006.01)

(52) U.S. Cl.
CPC ............... *G01S 13/88* (2013.01); *G01S 13/931* (2013.01); *H01Q 3/30* (2013.01); *H01Q 21/065* (2013.01); *H01Q 1/3233* (2013.01); *G01S 2013/9314* (2013.01); *G01S 2013/9317* (2013.01)

(58) Field of Classification Search
CPC .......... G01S 13/931; G01S 2013/9317; G01S 2013/9314; G01S 7/2813; G01S 7/282; G01S 7/285; H01Q 3/30; H01Q 21/065; H01Q 1/3233; H01Q 3/2617
USPC ........ 701/300, 96; 342/385, 70, 27, 109, 127, 342/107, 113, 117, 172, 28, 455, 82, 89; 340/933, 436, 901, 435, 903; 180/167, 180/271; 343/883, 758, 853; 455/127, 73
See application file for complete search history.

(56) References Cited

U.S. PATENT DOCUMENTS

| | | |
|---|---|---|
| 7,663,533 B2 | 2/2010 | Toennesen et al. |
| 2008/0211644 A1 | 9/2008 | Buckley et al. |
| 2008/0268790 A1 * | 10/2008 | Shi et al. .................... 455/73 |
| 2010/0201508 A1 | 8/2010 | Green et al. |

FOREIGN PATENT DOCUMENTS

| | | | |
|---|---|---|---|
| CN | 2514505 | 10/2002 | |
| CN | 1426131 | 6/2003 | |
| CN | 2724219 | 9/2005 | |
| DE | 10036132 | * 2/2002 | ............. G01S 7/28 |
| EP | 1 679 525 | 7/2006 | |
| JP | 3-89606 | 4/1991 | |
| WO | WO 2005/073753 | 8/2005 | |

OTHER PUBLICATIONS

International Search Report, PCT International Application No. PCT/EP2011/062192, dated Sep. 30, 2011.

* cited by examiner

*Primary Examiner* — Marthe Marc-Coleman
(74) *Attorney, Agent, or Firm* — Kenyon & Kenyon LLP

(57) ABSTRACT

Radar sensor for motor vehicles, including a transmitting antenna in the form of a planar array antenna having multiple adjacent antenna elements, and including a power supply system for supplying the antenna elements with microwave power. The power supply system is designed for supplying each pair of directly adjacent antenna elements with microwave power in phase opposition.

12 Claims, 3 Drawing Sheets

RADAR SENSOR FOR MOTOR VEHICLES, IN PARTICULAR RCA SENSOR

FIELD

The present invention relates to a radar sensor for motor vehicles, having a transmitting antenna in the form of a planar array antenna having multiple adjacent antenna elements, and having a power supply system for supplying the antenna elements with microwave power.

BACKGROUND INFORMATION

Antennas of radar sensors, which are provided for use in motor vehicles, are often designed as patch antennas on an RF substrate. This allows a cost-effective construction of the radar sensor. By using array antennas, the desired directional characteristic of the radar sensor in azimuth and/or elevation may be achieved without a radar lens being required. Separate antennas are often used for emitting the radar signal and for receiving the reflected signal. The desired directional characteristic of the transmitting antenna in azimuth may be achieved by supplying the multiple adjacent antenna elements on the substrate with in-phase microwave power. A radar lobe is then obtained by interference, whose main direction of emission is oriented at a right angle to the plane of the substrate and which covers an azimuth angle range of approximately −45° to approximately +45°. On the receiving side multiple adjacent antenna elements or patches are also used, which, however, belong to different receiving channels, so that the azimuth angle of the object may be inferred using the phase differences between the signals received by the different antenna elements.

In particular, the present invention concerns a radar sensor system for motor vehicles, which allows the cross traffic to be monitored, for example, in an RCA system (Rear Cross Alert), which supports the driver when backing up from or parking in a parking space by warning of vehicles approaching on a road or a parking lane perpendicular to the longitudinal direction of the vehicle. In this case, the radar sensor system must be capable of locating objects situated at a small distance from one's own vehicle in the longitudinal direction of the vehicle, but are at large azimuth angles to the right or left from one's own vehicle.

SUMMARY

An object of the present invention is to provide a simple and cost-effective radar sensor system which would allow objects to be located under large azimuth angles on both sides of one's own vehicle.

This object may be achieved according to the present invention by a radar sensor of the above-mentioned type in which the power supply system is designed for supplying each pair of directly adjacent antenna elements with microwave power in phase opposition.

Distinct minor lobes are then formed by interference between the radar waves emitted by the different antenna elements, so that most of the microwave power is emitted under large azimuth angles, i.e., for example, in angle ranges of −90° to 45° and of +45° to +90°. In this way it is possible to detect the cross traffic approaching one's own vehicle from the left or the right, using a single radar sensor.

In one preferred specific embodiment, the power supply system is designed in such a way that the amplitude of the emitted microwaves also varies from one antenna element to the other, for example, decreases from one end of the array of antenna elements to the opposite end. This makes the angular distribution of the emitted radar radiation uniform, so that locating gaps between the main lobe and the side lobes are largely closed.

According to one refinement of the present invention, the power supply system may be switched in such a way that the phase of every other antenna element may be switched between 0° and 180°. If all antennas are controlled in an in-phase manner, a conventional radar sensor is obtained, which allows objects to be located in the angle range of −45° to +45° with a relatively great locating depth. By switching over the phase for every other antenna element, a directional characteristic which is optimized for locating the cross traffic is obtained.

Exemplary embodiments of the present invention are explained below in greater detail with reference to the figures.

DETAILED DESCRIPTION OF EXAMPLE EMBODIMENTS

Figure 1:
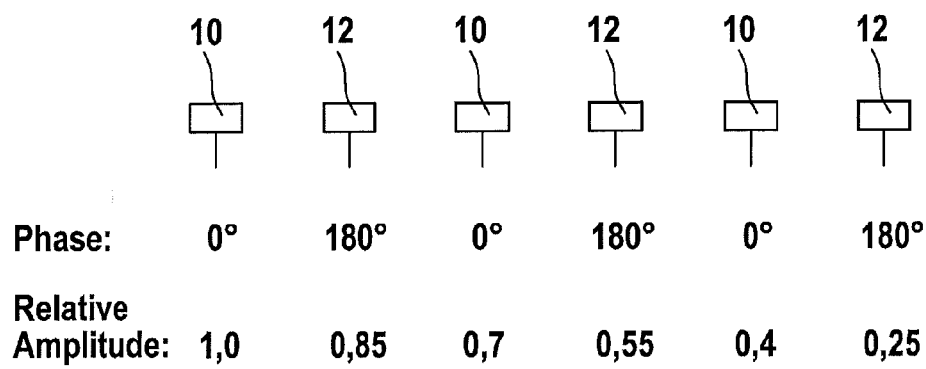
FIG. 1 shows a schematic illustration of multiple antenna elements situated on a substrate in a horizontal array, the phase and amplitude assignment of the individual antenna elements being specified.

FIG. 1 shows six antenna elements 10, 12, which are situated on an RF substrate in a horizontal array. The antenna elements are shown here as individual patches. The distances between the individual patches need not be uniform.

Antenna elements 10, 12 receive a microwave signal, which is then to be emitted as radar radiation, via a power supply system, which will be described below in greater detail.

The phase and amplitude assignment of antenna elements 10, 12 is also specified in FIG. 1. Antenna elements 10, i.e., the first, the third, and the fifth antenna elements in the array, receive in-phase signals (0°). The phases of antenna elements 12 lying in between are also in-phase among themselves (180°), but opposite to the phases of antenna elements 10. The amplitude of the signals decreases linearly over the array of antenna elements from left to right. If the amplitude of the leftmost antenna element 10 is normalized to 1.0, in this example, the amplitude from one antenna element to another decreases by 0.15 in each case.

Figure 2:
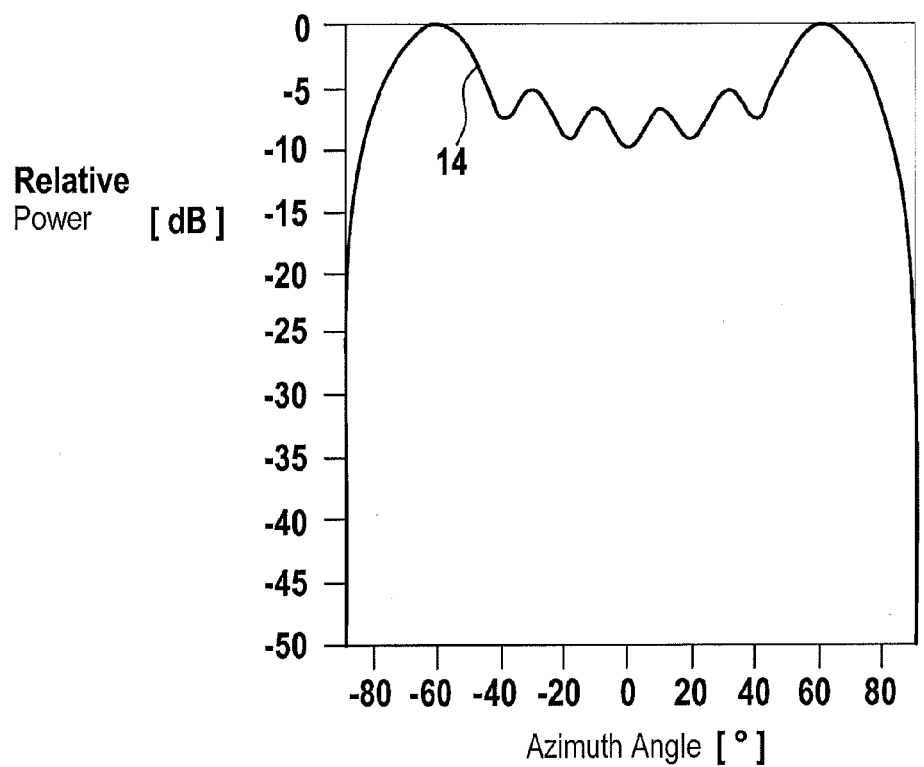
FIG. 2 shows an antenna diagram for the antenna system and the phase and amplitude assignments according to FIG. 1.

FIG. 2 shows the antenna diagram resulting from the phase and amplitude assignment shown in FIG. 1. Curve 14 in FIG. 2 provides the relative power of the radar radiation emitted by antenna elements 10, 12 as a function of the azimuth angle.

Distinct maxima occur at azimuth angles of ±70° due to interference between the radiation components emitted by individual antenna elements 10, 12. At smaller azimuth angles, there are further secondary maxima. At azimuth angle 0°, instead of a main maximum, there is a flat minimum. Due to the non-uniform amplitude assignment according to FIG. 1, it is achieved that the minima in the antenna diagram are pronounced relatively weakly, so that the power is distributed approximately uniformly over the entire azimuth angle range of −90° to +90°.

Figure 3:
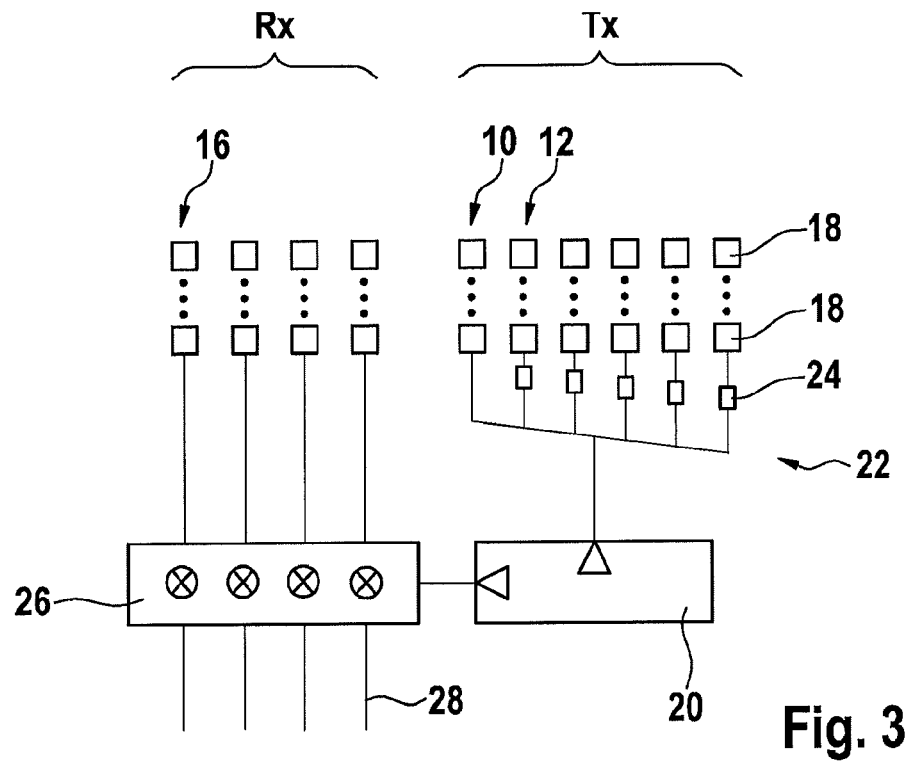
FIG. 3 shows a schematic diagram of a radar sensor according to one specific embodiment of the present invention.

FIG. 3 shows a detailed wiring diagram of the main components of a radar sensor having a transmitting antenna system according to FIG. 1.

The six antenna elements 10, 12 together form a transmitting antenna Tx. In this example, four further antenna elements 16 are situated at uniform lateral distances and together form a receiving antenna Rx. Antenna elements 10, 12, and 16 each have a column of patches 18, into which the microwave signal is coupled in an in-phase manner. Therefore, a directional characteristic having a distinct main maximum at elevation angle 0° (at a right angle to the substrate) is obtained in elevation by interference. This main maximum extends over an angle range of approximately −45° to approximately +45°. In contrast, only weak side lobes are formed.

In contrast, in azimuth, the directional characteristic of transmitting antenna Tx corresponds to the antenna diagram of FIG. 2, so that overall a vertically bundled radar beam, but which is widely fanned out horizontally, is obtained without the use of a radar lens.

The microwave power for transmitting antenna Tx is generated by an oscillator 20 and supplied to individual antenna elements 10, 12 via a semiparallel power supply system 22. This system branches from the output of oscillator 20 in parallel branches, which lead to each of antenna elements 10, 12. The configuration of the printed conductors is selected in such a way that the signal paths from the output of oscillator 20 to the input of the particular antenna element differ by one-half wavelength. The phase assignment shown in FIG. 1 is thus achieved. For the amplitude assignment to be set, each branch of power supply system 22 (with the exception of the leftmost branch) has a so-called impedance transformer 24, with the aid of which the power forwarded to the respective antenna element is adjusted to the required extent.

The four antenna elements 16 of receiving antenna Rx are connected to a four-channel mixer 26, which mixes the signal received from each individual antenna element 16 with the transmitted signal delivered by oscillator 20. At outputs 28 of four-channel mixer 26, intermediate frequency signals are obtained as mixing products, whose frequency corresponds to the frequency difference between the radiation emitted by transmitting antenna Tx and the radiation received by the corresponding antenna element 16 of receiving antenna Rx. Since the frequency of oscillator 20 is modulated in the shape of a ramp (FMCW radar; Frequency Modulated Continuous Wave), the frequency of the intermediate frequency signals is a function of the signal propagation time and thus the distance of the located object, as well as of the Doppler shift and thus the relative velocity of the object. The phase differences between the intermediate frequency signals represent phase differences between the radar echoes which are received by the different antenna elements 16. These phase differences are a function of the different lengths of the signal paths to adjacent antenna elements 16 and therefore provide information about the azimuth angle of the located object.

The analysis of the intermediate frequency signals is conventional and is not described here in greater detail.

Antenna elements 10, 12 of the transmitting antenna and antenna elements 16 of the receiving antenna, as well as power supply system 22, may be formed in microstrip technology on a shared substrate, which also accommodates four-channel mixer 26 and oscillator 20, as well as possibly other components of the radar sensor.

Figure 4:
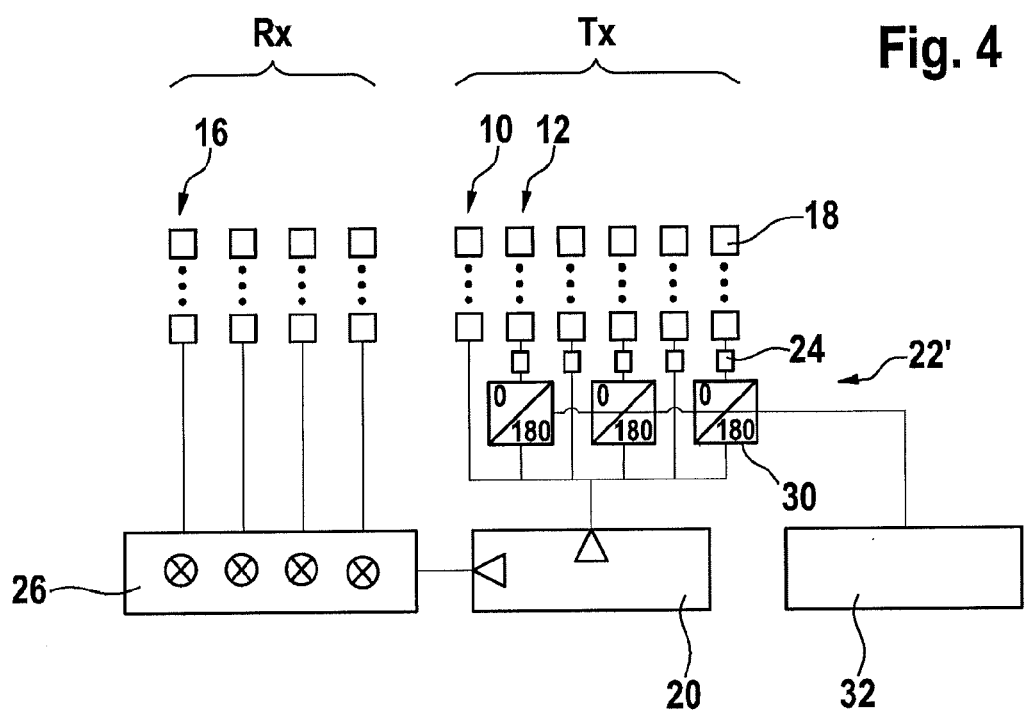
FIG. 4 shows a schematic diagram of a radar sensor according to a modified exemplary embodiment.

FIG. 4 shows a radar sensor according to a modified exemplary embodiment. Instead of power supply system 22 of FIG. 3, a power supply system 22' is provided here, in which a phase changeover switch 30 is provided for every other branch, i.e., for the branches leading to one of antenna elements 12. Depending on the switching state, the phase of the signal supplied by oscillator 20 is rotated 180° or left unchanged in the phase changeover switch. The three phase changeover switches 30 are controlled by a shared control unit 32.

In the operating mode where the phase is rotated, the directional characteristic corresponds to the antenna diagram of FIG. 2. In the operating mode in which the phase remains unchanged, a radiation bundled similarly as in elevation is, in contrast, also obtained in azimuth, so that objects in the angle range of −45° to +45° may be located even at a greater distance. The operating mode of the radar sensor may thus be adapted to the particular traffic situation with the aid of control unit 32.

In the case of the radar sensor of FIG. 4, impedance transformers 24 result in a slight attenuation of the main lobe in the operating mode without phase switchover. However, this is usually acceptable. Optionally, it is possible to omit impedance transformers 24 or design them in such a way that the power attenuation is reduced to a smaller extent. In the operating mode with bundled directional characteristic, a greater locating depth is achieved, but in this mode with a widely fanned-out characteristic, deeper minima must be accepted in the antenna diagram.

Figure 5:
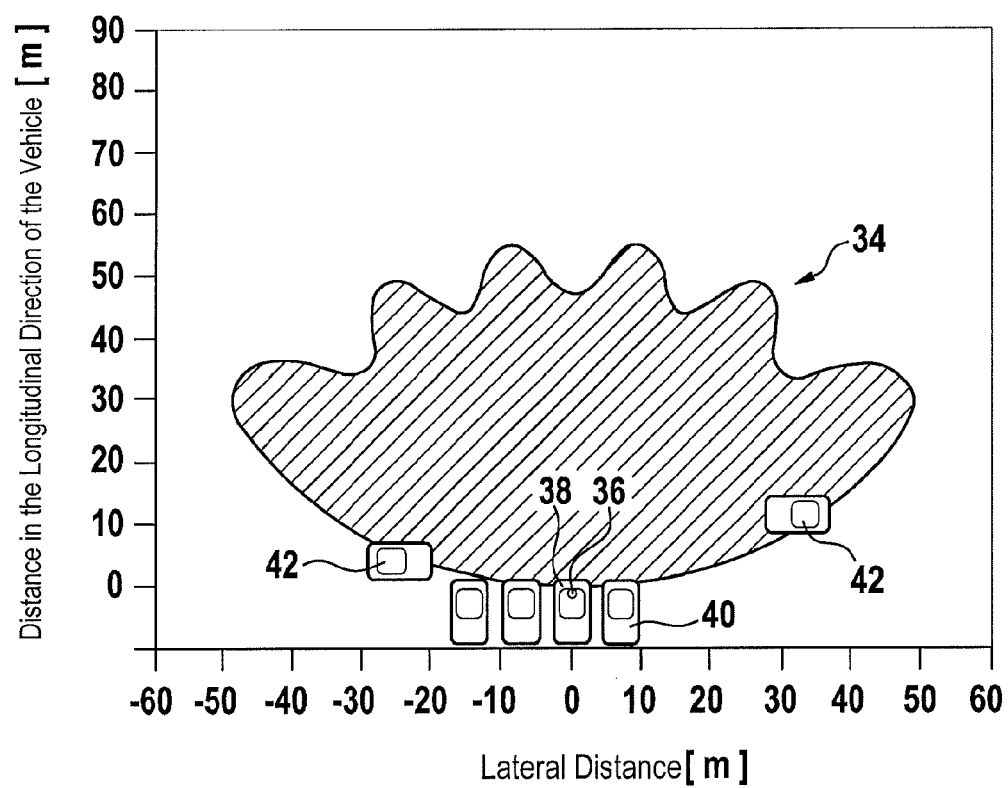
FIG. 5 shows a locating diagram of an RCA radar sensor according to the present invention.

FIG. 5 shows a locating field 34 of a radar sensor 36 according to the present invention of the radar sensor of FIG. 3, for example. Radar sensor 36 is built into the rear of a motor vehicle 38, so that azimuth angle 0° corresponds to the backward driving direction of the vehicle.

In the example shown, radar sensor 36 is part of an RCA system, which warns the driver of cross traffic when backing out of or parking in a parking space. FIG. 5 shows other vehicles 40, which form the parking space for vehicle 38. The cross traffic is symbolized by two other vehicles 42. Although these vehicles 42 are at a great lateral distance from vehicle 38, they are still in locating field 34, so that the driver of vehicle 38 may be warned of the approach of vehicles 42 in a timely manner.

What is claimed is:

1. A radar sensor for a motor vehicle, comprising:
   a radar sensor arrangement to locate objects, which are at a small longitudinal distance but at a great lateral distance from the vehicle, including:
   a transmitting antenna in the form of a planar array antenna having multiple adjacent antenna elements; and
   a power supply system to supply microwave power to the antenna elements, wherein the power supply system is configured to supply each pair of antenna elements directly adjacent to each other with microwave power in phase opposition.

2. The radar sensor as recited in claim 1, wherein the power supply system is configured to supply the antenna elements with microwave power at different amplitudes.

3. The radar sensor as recited in claim 2, wherein amplitudes decrease stepwise along the array of antenna elements from one end to the other, in equal intervals.

4. The radar sensor as recited in claim 1, wherein the power supply system includes a phase changeover switch for every other antenna element which leaves the phase unchanged or rotates it 180°, depending on a switching state.

5. The radar sensor as recited in claim 1, wherein the power supply system is configured so that the amplitude of the emitted microwaves varies from one antenna element to the other by decreasing from one end of the array of antenna elements to the opposite end, so as to make an angular distribution of emitted radar radiation uniform, so that locating gaps between a main lobe and side lobes are largely closed.

6. The radar sensor as recited in claim 1, wherein distinct maxima occur at azimuth angles of ±70° due to interference between the radiation components emitted by individual ones of the antenna elements, wherein at smaller azimuth angles, there are further secondary maxima, wherein at azimuth angle 0°, instead of a main maximum, there is a flat minimum, and wherein the power is distributed approximately uniformly over the entire azimuth angle range of −90° to +90°.

7. A driver assistance system for a motor vehicle, comprising:
a radar sensor system to locate objects, which are at a small longitudinal distance but at a great lateral distance from the vehicle, wherein the radar sensor system is a single radar sensor, the radar sensor including a transmitting antenna in the form of a planar array antenna having multiple adjacent antenna elements, and a power supply system to supply microwave power to the antenna elements, wherein the power supply system is configured to supply each pair of antenna elements directly adjacent to each other with microwave power in phase opposition.

8. The driver assistance system as recited in claim 7, wherein the power supply system is configured to supply the antenna elements with microwave power at different amplitudes.

9. The driver assistance system as recited in claim 8, wherein amplitudes decrease stepwise along the array of antenna elements from one end to the other, in equal intervals.

10. The driver assistance system as recited in claim 7, wherein the power supply system includes a phase changeover switch for every other antenna element which leaves the phase unchanged or rotates it 180°, depending on a switching state.

11. The driver assistance system as recited in claim 7, wherein the power supply system is configured so that the amplitude of the emitted microwaves varies from one antenna element to the other by decreasing from one end of the array of antenna elements to the opposite end, so as to make an angular distribution of emitted radar radiation uniform, so that locating gaps between a main lobe and side lobes are largely closed.

12. The driver assistance system as recited in claim 7, wherein distinct maxima occur at azimuth angles of ±70° due to interference between the radiation components emitted by individual ones of the antenna elements, wherein at smaller azimuth angles, there are further secondary maxima, wherein at azimuth angle 0°, instead of a main maximum, there is a flat minimum, and wherein the power is distributed approximately uniformly over the entire azimuth angle range of −90° to +90°.

* * * * *